United States Patent
Hung et al.

(10) Patent No.: US 11,493,900 B2
(45) Date of Patent: Nov. 8, 2022

(54) WARM-UP METHOD FOR MACHINE SYSTEM

(71) Applicant: HIWIN TECHNOLOGIES CORP., Taichung (TW)

(72) Inventors: Chen-Hsiung Hung, Taichung (TW); Yih-Chyun Hwang, Taichung (TW); Shui-Chin Lai, Taichung (TW); Yi Haung, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 587 days.

(21) Appl. No.: 16/544,547

(22) Filed: Aug. 19, 2019

(65) Prior Publication Data

US 2021/0055707 A1 Feb. 25, 2021

(51) Int. Cl.
G05B 19/401 (2006.01)

(52) U.S. Cl.
CPC .. G05B 19/401 (2013.01); *G05B 2219/37428* (2013.01); *G05B 2219/49057* (2013.01); *G05B 2219/49206* (2013.01)

(58) Field of Classification Search
None
See application file for complete search history.

(56) References Cited

U.S. PATENT DOCUMENTS

| 2012/0144685 | A1* | 6/2012 | Atwell | G05B 19/406 33/503 |
| 2016/0001410 | A1* | 1/2016 | Koyama | B23Q 11/0007 700/170 |

FOREIGN PATENT DOCUMENTS

| CN | 101158372 A | 4/2008 |
| DE | 102015110290 A1 | 1/2015 |
| JP | 8-19978 A | 1/1996 |
| JP | 2005-34929 A | 2/2005 |
| JP | 2015-66669 A | 4/2015 |
| TW | 201223690 A1 | 6/2012 |
| TW | M505365 U | 7/2015 |
| TW | 201819102 A | 6/2018 |
| TW | 201825229 A | 7/2018 |
| TW | I656939 B | 4/2019 |

OTHER PUBLICATIONS

Taiwanese Search Report, dated Apr. 28, 2020, for Taiwanese Applicaiton No. 108115757, with an English translation.
(Continued)

*Primary Examiner* — Sean Shechtman
(74) *Attorney, Agent, or Firm* — Birch, Stewart, Kolasch & Birch, LLP (57) ABSTRACT

A warm-up method for a machine system including a machine component and a machine sensor configured to sense temperature of the machine component is provided. The method comprises steps of; A) activating the machine component to execute a warm-up operation for warming up the machine component; B) determining whether the machine component is warmed up based on a target temperature corresponding to the machine component and a temperature of the machine component that is currently sensed by the machine sensor; and C) when it is determined that the machine component is warmed up, making the machine component not execute the warm-up operation.

8 Claims, 6 Drawing Sheets

(56) References Cited

OTHER PUBLICATIONS

Search Report appended to an Office Action, which was issued to Chinese counterpart Application No. 201910466854.1 by the CNIPA dated Apr. 30, 2021 with an English translation thereof.
German Office Action, dated Jun. 18, 2020, for German Application No. 102019213883.7.

* cited by examiner

WARM-UP METHOD FOR MACHINE SYSTEM

FIELD

The disclosure relates to a warm-up method for a machine system, especially for a machine system including a transmission mechanism.

BACKGROUND

A conventional machine tool performs a machining process on materials by driving machine components of the machine tool with a transmission mechanism. The machine components need to be warmed-up to appropriate temperature(s) before performing their tasks, in order to prevent producing faulty products due to thermal expansion of the machine components that would otherwise occur as the machine components are working if they were not warmed-up in advance. For example, CN 105269399 A discloses a machine tool with warm-up functionality that selects one of multiple warm-up operation programs based on the temperature around the machine tool. However, the determination as to when a machine component reaches an appropriate temperature in the warm-up method disclosed in CN 105269399 A is not precise enough. Conventional warm-up methods that cannot immediately detect whether the machine component reaches a desired temperature, such as the method disclosed in CN 105269399 A, may cause the machine component to warm up too little (i.e., not warm enough) or warm up too much (i.e., becomes too hot); both of these situations are unfavorable in the work efficiency of the machine tool.

SUMMARY

Therefore, an object of the disclosure is to provide a warm-up method that can alleviate at least one of the drawbacks of the prior art.

According to one aspect of the disclosure, a warm-up method for a machine system including a machine component and a machine sensor configured to sense temperature of the machine component is provided. The warm-up method including steps of: A) activating the machine component to execute a warm-up operation for warming up the machine component; B) determining whether the machine component is warmed up based on a target temperature corresponding to the machine component and a temperature of the machine component that is currently sensed by the machine sensor; and C) when it is determined that the machine component is warmed up, making the machine component not execute the warm-up operation.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
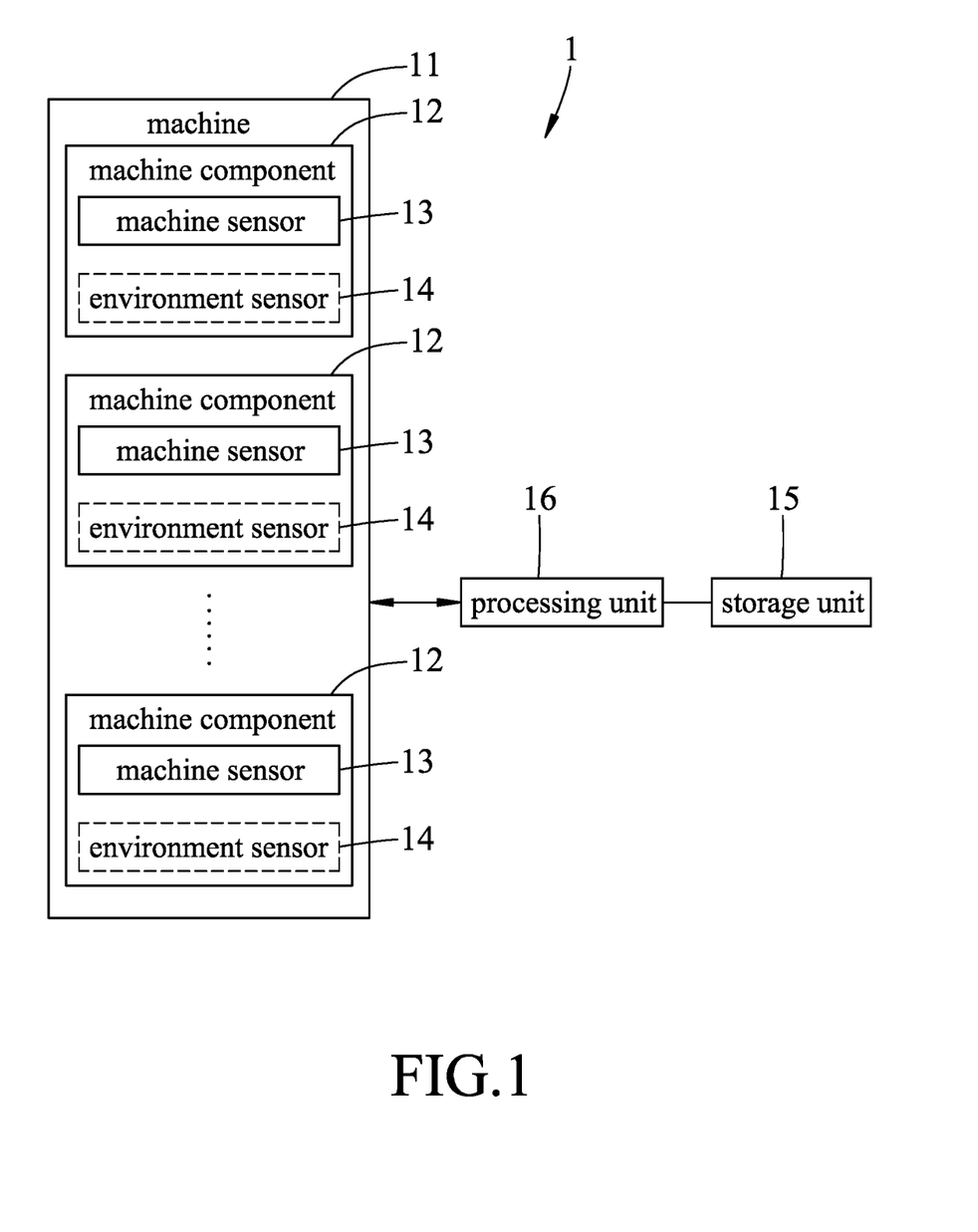
FIG. 1 is a block diagram exemplarily illustrating a machine system according to one embodiment of the disclosure.

FIG. 1 exemplarily illustrates a machine system 1 adapted to perform a warm-up method of the present disclosure that will be detailed later. According to an embodiment of the disclosure, the machine system 1 includes a machine 11 that includes a plurality of machine components 12. According to an embodiment, the machine 11 may be a machine tool, and each of the machine components 12 may be a transmission machine component such as a ball screw or a guideway. The machine system 1 also includes a plurality of machine sensors 13, a storage unit 15, and a processing unit 16 electrically connected to the storage unit 15, the machine sensors 13 and the machine components 12. The machine sensors 13 are disposed respectively on the machine components 12, and each senses temperature of the respective machine component 12. In the exemplary embodiment illustration of FIG. 1, the numbers of the machine components 12 and the machine sensors 13 are plural, but the disclosure is not limited thereto.

According to an embodiment, the machine system 1 may further include a plurality of environment sensors 14 disposed on/in the machine 11 to sense temperature of surroundings of the machine components 12. The number of the environment sensors 14 may be greater than, equal to, or less than the number of the machine components 12. For example, according to some embodiments, the environment sensors 14 may equal to the machine components 12 in number, and are disposed respectively on or in the proximity of the machine components 12, as exemplarily illustrated in FIG. 1. However, the machine system 1 may include only one environment sensor 14 according to another embodiment.

Each machine sensor 13 senses the temperature (referred to as "machine temperature" hereinafter) of the corresponding one of the machine components 12 at plural time points, and information about the sensed machine temperatures is received by the processing unit and is then recorded in the storage unit 15. Information about operation states of the machine components 12, i.e., at-work or off-work, at the plural time points is also recorded in the storage unit 15. In an embodiment where the machine system 1 includes the environment sensors 14, the environment sensors 14 sense the temperature (referred to as "surrounding temperature" hereinafter) of surroundings of the machine components 12 at the plural time points, and information about the sensed surrounding temperatures is received by the processing unit 16 and is then recorded in the storage unit 15 too.

Figure 2:
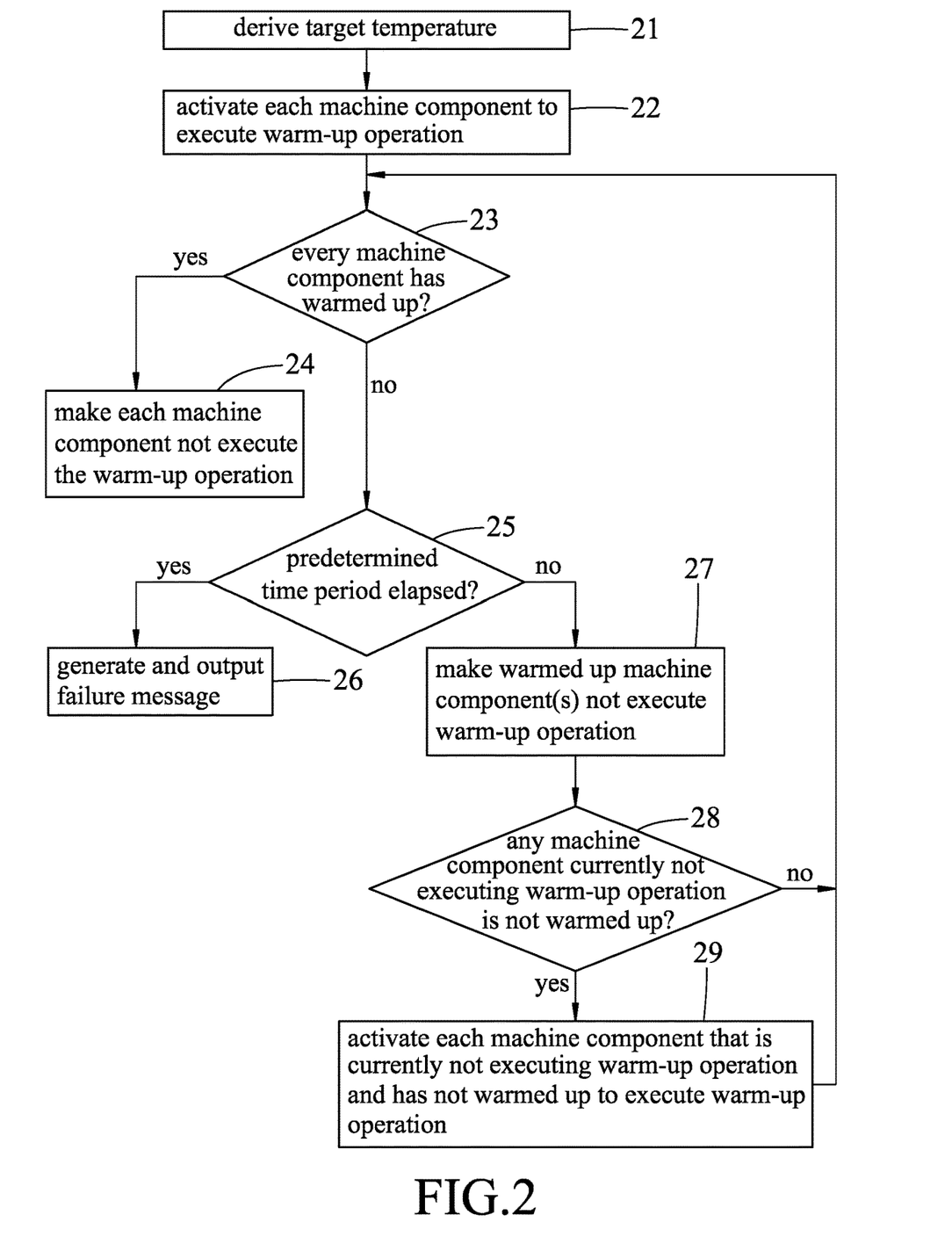
FIG. 2 is a flow chart of a warm-up method according to an embodiment of the disclosure.

FIG. 2 exemplarily illustrates a warm-up method that may be performed by the machine system 1 according to one embodiment of the disclosure.

Figure 3:
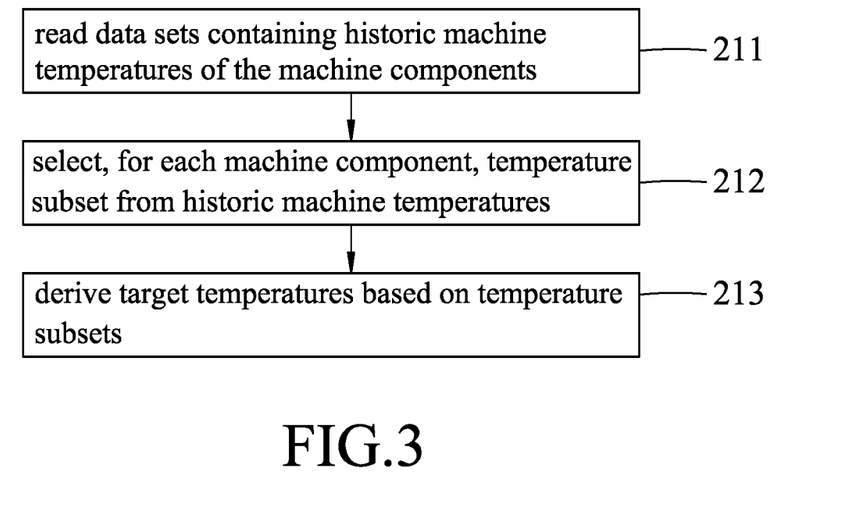
FIG. 3 is a flow chart exemplarily illustrating detailed operations of step 21 of FIG. 2 according to an embodiment.

In step 21, the processing unit 16 derives, for each of the machine components 12, a target temperature corresponding to the machine component 12. According to some embodiments, step 21 may be omitted, and the target temperature of the machine component 12 may be predetermined by an operator of the machine system 1 by experience or may be preset by a manufacturer of the machine system 1. The target temperature of the machine component 12 may be derived in step 21 based on at least one of plural historic machine temperatures of the machine component 12 that were sensed by the corresponding machine sensor 13 respectively at plural past time points and that are stored in the storage unit 15. FIG. 3 exemplarily illustrates detailed operations of step 21 that includes sub-steps 211-213.

In sub-step 211, the processing unit 16 reads a plurality of data sets from the storage unit 15. Each of the data sets corresponds to one of the machine components 12 and one of the past time points, and includes a historic machine temperature of the corresponding machine component 12 that was sensed at the corresponding past time point and an operation state of the corresponding machine component 12 (at-work or off-work) at the corresponding past time point. The plural past time points may be designated to be time points within a particular time period. For example, in an embodiment, the plural past time points are within a time period that started from two days before a current time point when the method is currently performed.

Figure 4:
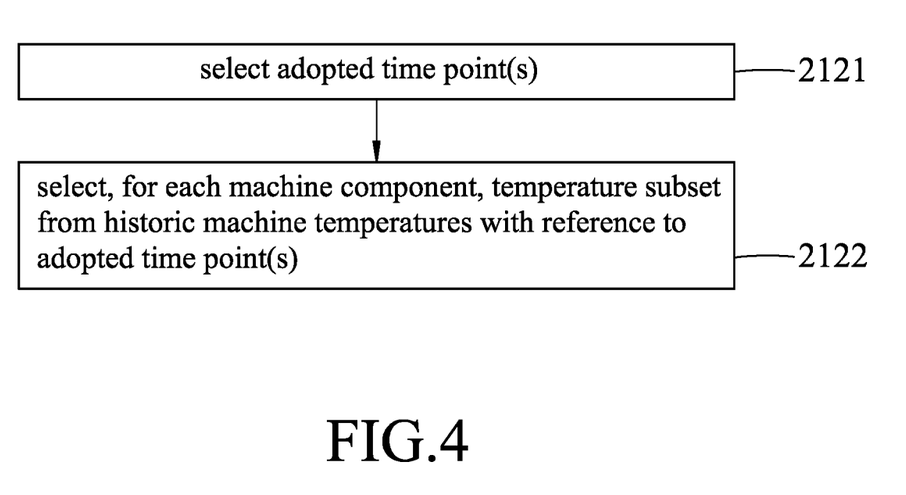
FIG. 4 is a flow chart exemplarily illustrating sub-steps of step 212 of FIG. 3 according to an embodiment.

In sub-step 212, the processing unit 16 selects, for each of the machine components 12, a temperature subset from the historic machine temperatures of the machine component 12. FIG. 4 exemplarily illustrates sub-steps 2121 and 2122 of sub-step 212 according to an embodiment.

In sub-step 2121, the processing unit 16 selects at least one adopted time point from the plural past time points based on the plurality of data sets thus read. Each of the at least one adopted time point should meet the following two conditions: i) every machine component 12 was at work (e.g., marked in the corresponding data set as "at-work" as opposed to "off-work") at the time point; and ii) at the time point, no machine component 12 was sensed to have a machine temperature exceeding a working-temperature threshold associated with the machine component 12. The working-temperature thresholds respectively of the machine components 12 may be determined, for example, by an operator of the machine system 1 based on experience, with reference to working conditions of the machine components 12, or both.

Table 1 below schematically shows an example of the content of the data sets read in step 211, where the machine 11 has three machine components 12, i.e., component A, component B and component C, machine temperatures of which were sensed at four past time points, i.e., T1-T4. Assuming that the working-temperature threshold of components A, B and C are all 70° C., in sub-step 2121, time points T2 and T4 would be selected as the adopted time points since components A, B and C are all at work at time points T2 and T4, and since the machine temperatures of components A, B and C sensed at time points T2 and T4 are all under 70° C.

TABLE 1

|  | T1 | T2 | T3 | T4 |
|---|---|---|---|---|
| component A | at-work; 34° C. | at-work; 61° C. | off-work; 62° C. | at-work; 55° C. |
| component B | at-work; 80° C. | at-work; 52° C. | at-work; 50° C. | at-work; 50° C. |
| component C | at-work; 65° C. | at-work; 43° C. | at-work; 31° C. | at-work; 51° C. |

Then, in sub-step 2122, the processing unit 16 selects, for each of the machine components 12, a temperature subset from the historic machine temperatures of the machine component 12 with reference to the at least one adopted time point. In particular, the temperature subset includes at least one of the historic machine temperatures of the corresponding machine component 12 that corresponds to the at least one adopted time point and that does not exceed a machine-temperature threshold corresponding to the corresponding machine component 12. That is, the temperature subset of the machine component 12 that is selected in sub-step 2122 is composed of historic machine temperature(s) of the machine component 12 that was/were sensed respectively at the adopted time point(s) selected in sub-step 2121 and that does/do not exceed the machine-temperature threshold of the machine component 12. For each machine component 12, the machine-temperature threshold may be predetermined, for example, by the operator of the machine system 1 based on experience, with reference to working conditions of the machine component 12, or both.

Continuing with the abovementioned example of Table 1 where two adopted time points T2 and T4 have been selected in sub-step 2121, and assuming that the machine-temperature thresholds of components A, B and C are 60° C., 55° C. and 50° C., respectively, in sub-step 2122, the processing unit 16 would select a temperature subset for component A to include a historic machine temperature of 55° C. sensed at T4, a temperature subset for component B to include two historic machine temperatures of 52° C. and 50° C. sensed at T2 and T4, and a temperature subset for component C to include a historic machine temperature of 43° C. sensed at T2.

Referring back to FIG. 3, in sub-step 213, the processing unit 16 derives, for each of the machine components 12, the target temperature corresponding to the machine component 12 based on the temperature subset selected in sub-step 212 for the machine component 12. For example, in an embodiment, the target temperature of a machine component 12 is a mean value of the top five to twenty percent of the historic machine temperature(s) in the temperature subset of the machine component 12.

Figure 5:
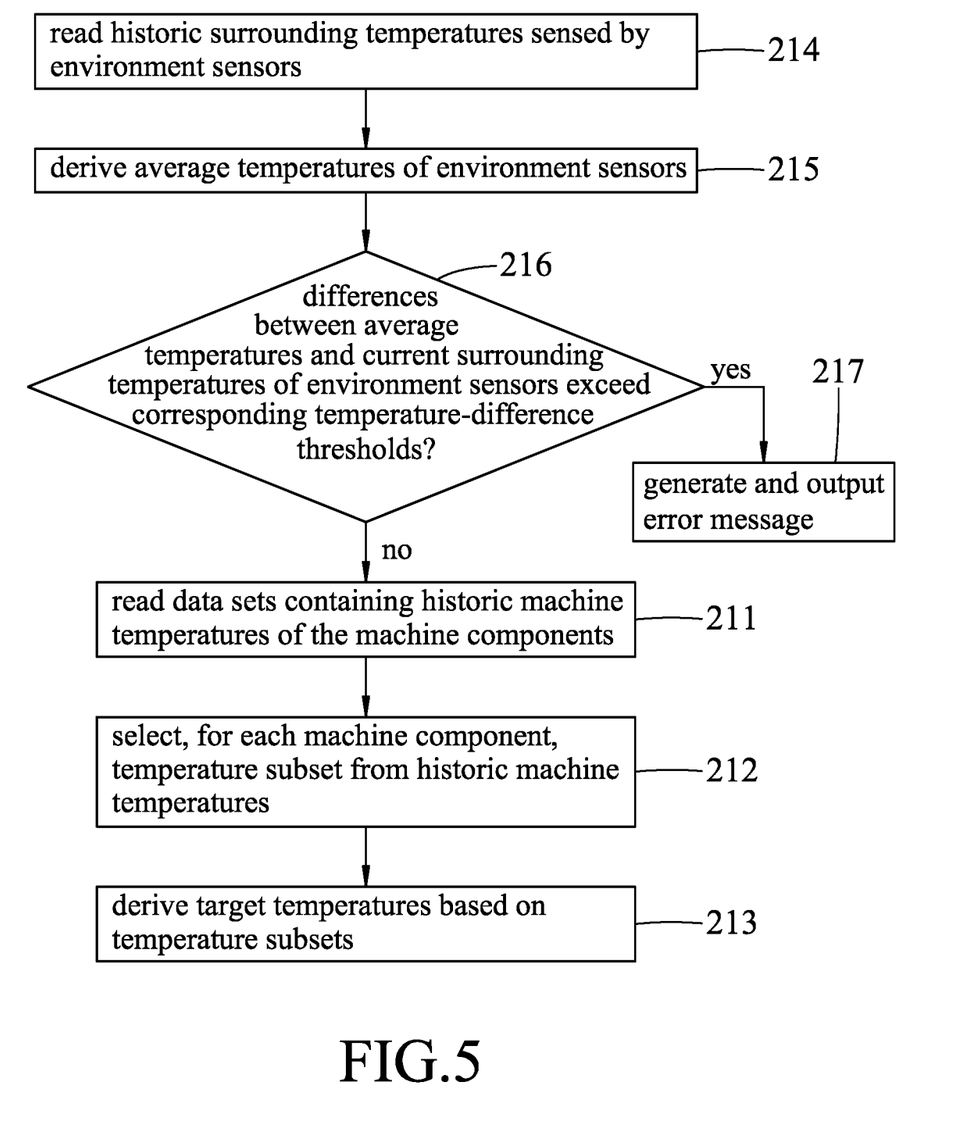
FIG. 5 is a flow chart exemplarily illustrating further detailed operations of step 21 of FIG. 2 according to an embodiment.

According to an embodiment, the detailed operations of step 21 may further include sub-steps 214-217 in addition to sub-steps 211-213, as illustrated in FIG. 5.

Referring to FIG. 5, in sub-step 214, the processing unit 16 reads a plurality of historic surrounding temperatures from the storage unit 15. The historic surrounding temperatures were sensed by the environment sensors 14 at the plural past time points which may be, for example, within a time period that started from two days before the current time point when the method is currently performed.

In sub-step 215, for each of the environment sensors 14, the processing unit 16 derives an average temperature. The average temperature is an average of plural historic surrounding temperatures that were sensed by the environment sensor 14 respectively at the plural past time points.

In sub-step 216, the processing unit 16 determines, for each of the environment sensors 14, whether a difference between the average temperature of the environment sensor 14 and a current surrounding temperature currently sensed by the environment sensor at the current time point exceeds a temperature-difference threshold corresponding to the environment sensor 14. For each environment sensor 14, the temperature-difference threshold may be predetermined, for example, by the operator of the machine system 1 based on experience, with reference to working conditions of corresponding machine component(s) 12, or both. When it is determined in sub-step 216 that said differences of all of the environment sensors 14 exceed the corresponding temperature-difference thresholds, the procedure goes to sub-step 217; otherwise, the procedure goes to sub-step 211 and then to sub-steps 212 and 213 as described above with respect to FIG. 3.

In sub-step 217, the processing unit 16 generates and outputs an error message indicative of an abnormal surrounding temperature.

It can be appreciated that alterations may be made to the process illustrated in FIG. 5. In particular, sub-step 211 may be incorporated in sub-step 214. That is, the processing unit 16 may read all of the required data sets (related to machine temperatures) and historic surrounding temperatures from the storage unit 15 at once.

Referring back to FIG. 2, after the target temperatures corresponding respectively to the machine components 12 have been derived in step 21, in step 22, the processing unit 16 activates each of the machine components 12 to execute a warm-up operation for warming up the machine components 12 in response to, for example, a user input from an operator of the machine system 1.

In step 23, the processing unit 16 determines, for each of the machine components 12, whether the machine component 12 has warmed up based on the target temperature corresponding to the machine component 12 and a temperature of the machine component 12 that is currently sensed by the machine sensor 13 corresponding to the machine component 12, and further determines whether every machine component 12 has warmed up. If it is determined that every machine component 12 has warmed up, the procedure goes to step 24; otherwise, the procedure goes to step 25. According to an embodiment, the determination as to whether a machine component 12 is warmed up is based on whether the temperature of the machine component 12 reaches the target temperature corresponding to the machine component 12.

In step 24, the processing unit 16 makes the machine components 12 not execute the warm-up operation, including stopping each of the machine components 12 that is currently executing the warm-up operation from continuing to execute the warm-up operation. According to an embodiment, the processing unit 16 may further generate and output a completion message in step 24 to inform operator(s) of the machine system 1 that the machine components 12 have successfully warmed up.

In step 25, the processing unit 16 determines whether a predetermined time period has elapsed since step 22 is performed. If so, the procedure goes to step 26; otherwise, the procedure goes to step 27. According to an embodiment, the predetermined time period may be, for example, an hour or several hours.

In step 26, the processing unit 16 generates and outputs a failure message, and the procedure ends.

In step 27, the processing unit 16 determines whether only a portion of the machine component(s) 12 is already warmed up, and makes this portion of the machine components 12 not execute the warm-up operation when the determination is affirmative. The step of making the portion of the machine components 12 not execute the warm-up operation includes making each machine component 12 in the portion that is currently executing the warm-up operation (if any) stop executing the warm-up operation, and making each machine component 12 in the portion that is not executing the warm-up operation (if any) remain not executing the warm-up operation.

In step 28, the processing unit 16 determines whether at least one of the machine components 12 that is currently not executing the warm-up operation is not warmed up (i.e., the temperature of the machine component 12 is lower than the target temperature). If so, the procedure goes to step 29; otherwise, the procedure goes back to step 23. Specifically, by performing step 28, a machine component 12 that has stopped executing the warm-up operation a while ago (i.e., in a former iteration of step 27) and that has cooled down (e.g., the machine component's temperature has fallen under its target temperature) can be identified.

In step 29, the processing unit 16 activates each of said at least one of the machine components 12 to execute the warm-up operation. Then, the procedure goes back to step 23.

The disclosed warm-up method as illustrated in FIG. 2 is especially beneficial in that a target temperature can be precisely selected (e.g., customized) with respect to an individual machine component 12, and that each of the machine components 12 is guaranteed to have reached the respective target temperature after normal and successful completion of the warm-up method. Furthermore, the disclosed warm-up method can immediately (or almost immediately) detect completion of warming-up of each machine component 12, such that the likelihood of the machine components 12 having warmed up too much can be reduced. In addition, the disclosed warm-up method of FIG. 2 is energy-efficient because the warm-up operation of an individual machine component 12 is terminated once it is detected that the machine component 12 has reached its target temperature in step 27, before the whole warm-up procedure is completed.

Figure 6:
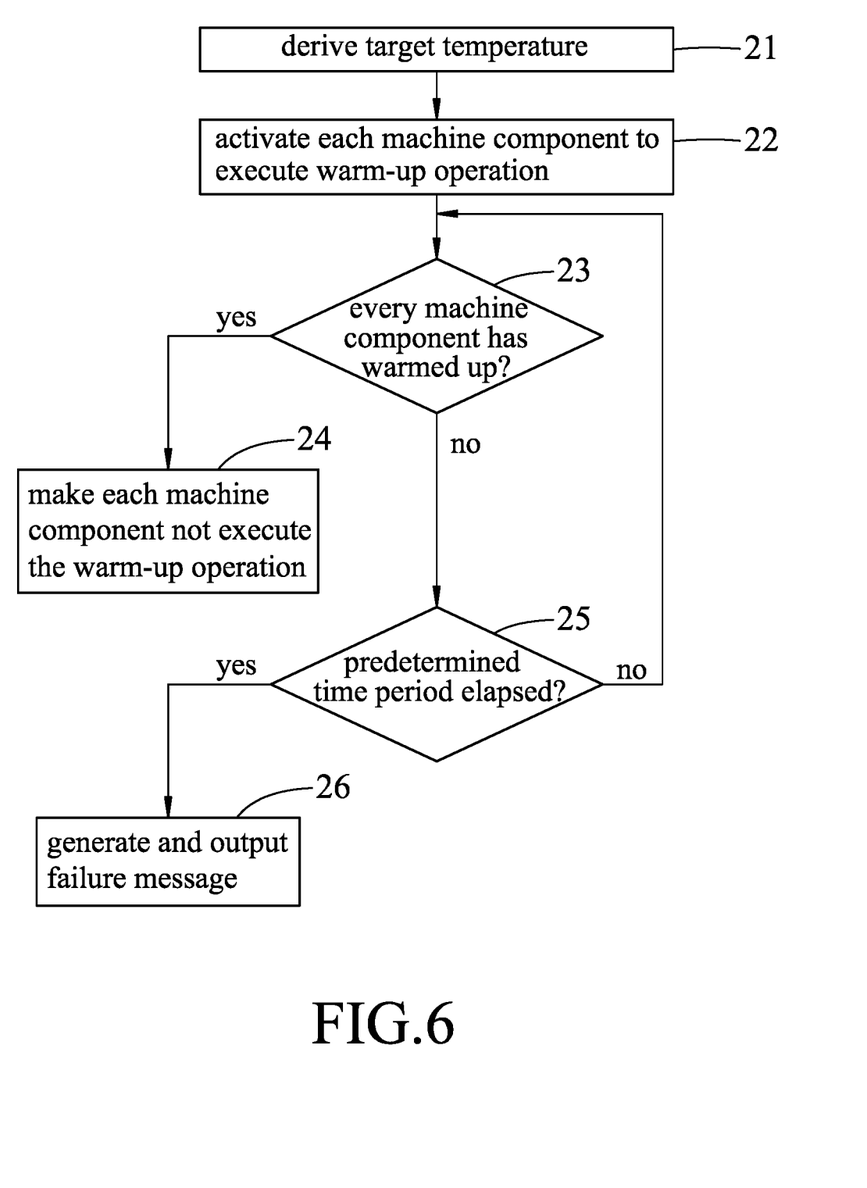
FIG. 6 is a flow chart of a warm-up method according to another embodiment of the disclosure.

The disclosed method may be altered on demand. For example, FIG. 6 illustrates a warm-up method according to another embodiment of the disclosure. The warm-up method of this embodiment is similar to the warm-up method of FIG. 2, and is a simplified version of the warm-up method of FIG. 2. It can be seen in FIG. 6 that this simplified warm-up method includes only steps 21-26, and steps 27-29 are omitted. In the warm-up method of this embodiment, when it is determined in step 25 that the predetermined time period has not elapsed, the procedure goes back to step 23, rather than goes to steps 27-29 as in FIG. 2. Therefore, in the disclosed warm-up method of FIG. 6, when it is determined in step 23 that every machine component 12 has warmed up, all of the machine components 12 of the machine 11 will be made to stop executing the warm-up operation simultaneously in step 24.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A warm-up method for a machine system including a plurality of machine components, a plurality of machine sensors each configured to sense a temperature of a respective one of the machine components, and a processing unit electrically connected to the machine component and the machine sensor, the machine component being a transmission machine component, the method comprising steps of:
   A) for each of the machine components, deriving, by the processing unit, a target temperature corresponding to the machine component based on at least one of plural historic machine temperatures of the machine component that were sensed by the corresponding one of the machine sensors respectively at plural past time points, so that a plurality of target temperatures corresponding respectively to the machine components are determined;
   B) with respect to each of the machine components, activating, by the processing unit, the machine component to execute a warm-up operation for warming up the machine component;
   C) determining, by the processing unit, whether the machine components are all warmed up based on the plurality of target temperatures thus determined and the temperatures respectively of the machine components that are currently sensed by the machine sensors;
   D) when it is determined that the machine components are all warmed up, making, by the processing unit, the machine components not execute the warm-up operation by stopping each of the machine components that is currently executing the warm-up operation from continuing to execute the warm-up operation;
   E) when it is determined that only a portion of the machine components is warmed up, making, by the processing unit, the portion of the machine components not execute the warm-up operation; and
   F) repeating step C) after step E),
   wherein step A) includes sub-steps of:
      A-1) selecting at least one adopted time point from the plural past time points, wherein each of the machine components was at work at each of the at least one adopted time point, and wherein for each of the machine components, the historic machine temperature sensed at any of the at least one adopted time point does not exceed a working-temperature threshold associated with the machine component;
      A-2) for each of the machine components, selecting a temperature subset from the historic machine temperatures of the machine component, wherein the temperature subset includes at least one of the historic machine temperatures that corresponds to the at least one adopted time point, and wherein the temperature subset does not include any one of the historic machine temperatures that exceeds a machine-temperature threshold corresponding to the machine component; and
      A-3) for each of the machine components, deriving the target temperature corresponding to the machine component based on the temperature subset for the machine component.

2. The warm-up method of claim 1, wherein step E) includes:
   when it is determined that only a portion of the machine components is warmed up, making each of the machine component(s) in the portion that is currently executing the warm-up operation stop executing the warm-up operation.

3. The warm-up method of claim 1, further comprising, after step E), steps of:
   G) determining, by the processing unit, whether at least one of the machine components that is currently not executing the warm-up operation is not warmed up; and
   H) when it is determined that at least one of the machine components that is currently not executing the warm-up operation is not warmed up, activating, by the processing unit, each of said at least one of the machine components to execute the warm-up operation.

4. The warm-up method of claim 1, wherein step D) includes:
   when it is determined that the machine components are all warmed up, making each of the machine components stop executing the warm-up operation.

5. The warm-up method of claim 1, wherein, in step C), the determination as to whether the machine component are all warmed up is based on whether the temperatures respectively of the machine components have reached the target temperatures respectively corresponding to the machine components.

6. A warm-up method for a machine system including a machine component, a machine sensor configured to sense temperature of the machine component, a processing unit electrically connected to the machine component and the machine sensor, and an environment sensor configured to sense temperature of surroundings of the machine component, the machine component being a transmission machine component, the method comprising steps of:
   deriving, by the processing unit, an average temperature for the environment sensor, the average temperature being an average of plural historic surrounding temperatures that were sensed by the environment sensor respectively at the plural past time points; and
   determining, by the processing unit, whether a difference between the average temperature of the environment sensor and a current surrounding temperature currently sensed by the environment sensor at a current time point exceeds a temperature-difference threshold corresponding to the environment sensor,
   wherein the method further comprises following steps that are to be performed only when it is determined that the difference between the average temperature of the environment sensor and the current surrounding temperature does not exceed the corresponding temperature-difference threshold:
   activating, by the processing unit, the machine component to execute a warm-up operation for warming up the machine component;
   deriving, by the processing unit, a target temperature corresponding to the machine component based on at least one of plural historic machine temperatures of the machine component that were sensed by the machine sensor respectively at plural past time points;
   determining, by the processing unit, whether the machine component is warmed up based on the target temperature and a temperature of the machine component that is currently sensed by the machine sensor; and when it is determined that the machine component is warmed up, making, by the processing unit, the machine component not execute the warm-up operation.

7. The warm-up method of claim 6, wherein the step of deriving a target temperature includes sub-steps of:
selecting at least one adopted time point from the plural past time points, wherein the machine component was at work at each of the at least one adopted time point, and wherein no historic machine temperature sensed at any of the at least one adopted time point exceeds a working-temperature threshold associated with the machine component;
selecting a temperature subset from the historic machine temperatures of the machine component, wherein the temperature subset includes at least one of the historic machine temperatures that corresponds to the at least one adopted time point, and wherein the temperature subset does not include any one of the historic machine temperatures that exceeds a machine-temperature threshold corresponding to the machine component; and
deriving the target temperature based on the temperature subset.

8. The warm-up method of claim 6, further comprising steps of:
when it is determined that the machine component has not warmed up yet, determining, by the processing unit, whether a predetermined time period has elapsed since the machine component was activated to execute the warm-up operation; and
generating and outputting, by the processing unit, a failure message when it is determined that the predetermined time period has elapsed.

* * * * *